United States Patent
Shimamura et al.

[11] Patent Number: 5,216,935
[45] Date of Patent: Jun. 8, 1993

[54] BIDIRECTIONAL CONTROL ARRANGEMENT FOR VEHICLE

[75] Inventors: Teruo Shimamura; Kazuo Samejima; Yoshikazu Togoshi; Yoshihiro Kawahara, all of Sakai, Japan

[73] Assignee: Kubota Ltd., Osaka, Japan

[21] Appl. No.: 892,415

[22] Filed: Jun. 1, 1992

Related U.S. Application Data

[63] Continuation of Ser. No. 715,047, Jun. 12, 1991, which is a continuation of Ser. No. 405,796, Sep. 11, 1989, abandoned.

[30] Foreign Application Priority Data

Dec. 16, 1988 [JP] Japan ................ 63-318739

[51] Int. Cl.$^5$ ............................................. G05G 1/14
[52] U.S. Cl. ........................................ 74/512; 74/474; 74/513; 74/560
[58] Field of Search ........... 74/512, 513, 474, 481, 74/560, 564

[56] References Cited

U.S. PATENT DOCUMENTS

| | | | |
|---|---|---|---|
| 2,600,767 | 6/1952 | Herrell | 74/513 |
| 2,662,622 | 12/1953 | Rodeback | 74/513 |
| 2,927,667 | 3/1960 | Herrmann | 74/513 X |
| 3,412,627 | 11/1968 | Goodacre | 74/483 |
| 3,939,726 | 2/1976 | Ahrens | 74/513 |
| 4,010,657 | 3/1977 | Amdall | 74/474 X |
| 4,179,949 | 12/1979 | Hildebrecht | 74/513 X |
| 4,245,527 | 1/1981 | Hildebrecht | 74/474 X |
| 4,250,768 | 2/1981 | Hildebrecht | 74/474 X |
| 4,633,727 | 1/1987 | Pike | 74/512 X |
| 4,763,538 | 8/1988 | Fujita et al. | 74/6 |
| 5,048,638 | 9/1991 | Duncan et al. | 74/474 |

FOREIGN PATENT DOCUMENTS

| | | | |
|---|---|---|---|
| 0360132 | 3/1990 | European Pat. Off. | 74/512 |
| 2738073 | 3/1979 | Fed. Rep. of Germany | 74/560 |
| 716888 | 12/1931 | France | 74/474 |
| 60-146729 | 8/1985 | Japan | 74/512 |
| 56-97131 | 8/1988 | Japan | 74/512 |
| 925225 | 5/1963 | United Kingdom | 74/560 |
| 2193273 | 2/1988 | United Kingdom | 475/298 |

Primary Examiner—Vinh T. Luong
Attorney, Agent, or Firm—Jordan and Hamburg

[57] ABSTRACT

A bidirectional control arrangement for a vehicle comprising a seesaw type pedal including a forward drive depress pad and a backward drive depress pad for controlling a hydrostatic stepless transmission. A down-toe motion of an operator's foot applied to the forward drive depress pad controls the transmission for accelerating the vehicle forward, while a down-toe motion thereof applied to the backward drive depress pad controls the transmission to accelerate the vehicle backward. The forward and backward drive depress pads are spaced apart longitudinally of the vehicle and offset from each other transversely of the vehicle.

2 Claims, 4 Drawing Sheets

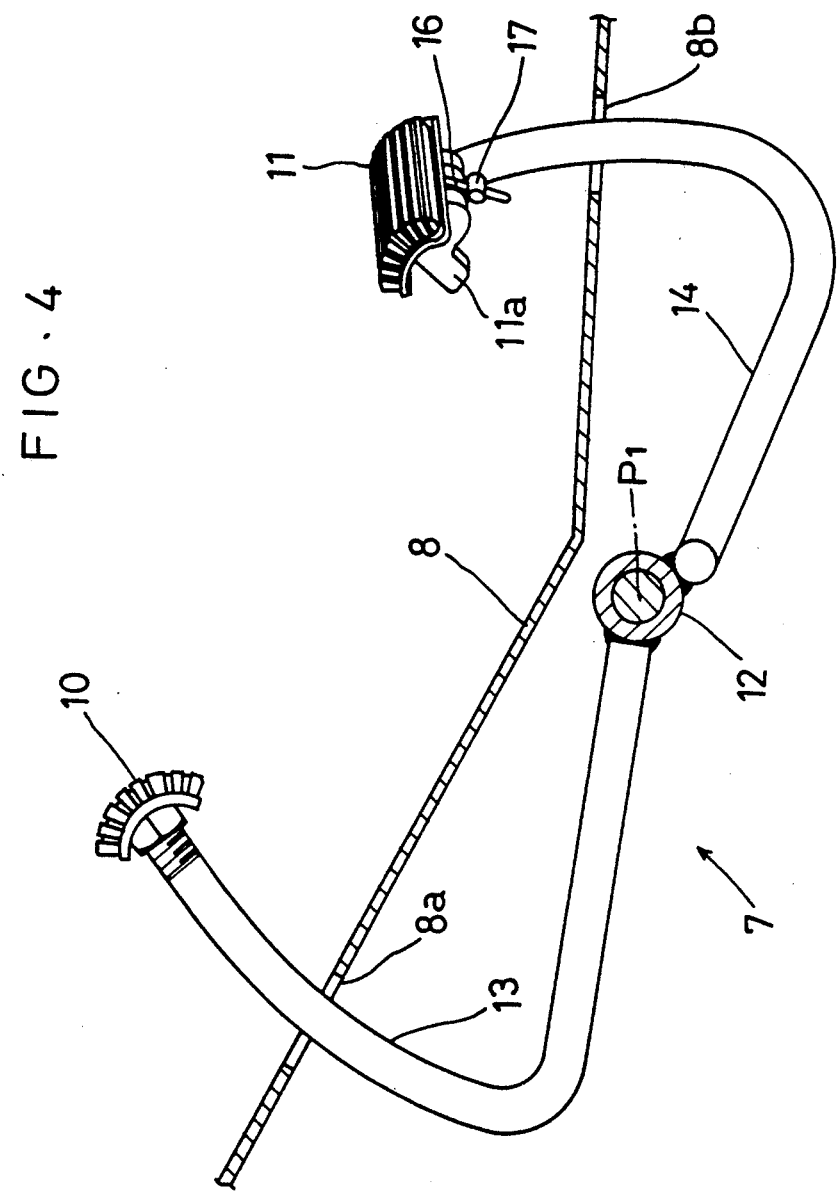

5,216,935

BIDIRECTIONAL CONTROL ARRANGEMENT FOR VEHICLE

This application is a continuation, of application Ser. No. 07/715,047, filed Jun. 12, 1991, which is a continuation of application Ser. No. 07/405,796, filed Sep. 11, 1989 now abandoned.

BACKGROUND OF THE INVENTION

The present invention relates to a bidirectional control arrangement for a working vehicle having a hydrostatic stepless transmission which provides a plurality of speeds for backward drive as well as forward drive across a neutral position, and particularly to a bidirectional control arrangement including a seesaw type change speed pedal.

This type of bidirectional control arrangement is disclosed, for example, in Japanese Patent Publication Kokai No. 60-146729. In the disclosed arrangement, the hydrostatic stepless transmission provides an increasingly high forward speed when a down-toe motion is applied to the change speed pedal, and an increasingly high backward speed when a down heel motion is applied to the pedal.

The change speed pedal includes a forward drive depress pad and a backward drive depress pad at longitudinally opposite ends thereof. A down-toe motion is applied to the pedal by a foot placed on the forward drive depress pad, while a down-heel motion is applied to the backward drive depress pad.

Generally, it is difficult to effect delicate speed controls with the heel, and therefore the backward drive depress pad may also be applied with a down-toe motion. In other words, it is conceivable to provide a change speed pedal having an increased length so that the forward and backward drive depress pedals are spaced apart by an increased distance. However, the foot must be moved over an extensive range for depressing the pedal for forward drive and backward drive. This results in the disadvantages of low operating efficiency and of requiring a large space in the fore and aft direction for accommodating the elongated change speed pedal.

SUMMARY OF THE INVENTION

Having regard to the above disadvantages of the prior art, an object of the present invention is to provide an improvement upon the type of control arrangement noted in the outset hereof, which allows also the backward drive depress pad on the change speed pedal to be depressed with a down-toe motion of a foot.

In order to achieve the above object, a bidirectional control arrangement for a vehicle is provided, according to the present invention, which comprises a first pedal member and a second pedal member interlocked to each other to make a seesaw-like movement, an output member linearly reciprocable between a neutral position and two opposite extreme positions, and linkage means for transmitting a down-toe motion of an operator's foot applied to the first pedal member to the output member as movement in one direction of the output member, and transmitting a down-toe motion of the operator's foot applied to the second pedal member to the output member as movement in another direction of the output member, wherein the first pedal member and the second pedal member are spaced apart longitudinally of the vehicle and offset from each other transversely of the vehicle.

Where the first pedal member, e.g. a forward drive depress pad of a change speed pedal, and the second pedal member, e.g. a backward drive depress pad of the pedal, are arranged as above, the operator depressing the forward drive depress pad with the toe-end of his or her foot may turn the toe-end outwardly while moving the heel rearwardly, to be able to depress the backward drive depress pad with the toe-end. Consequently, the change speed pedal need not be very long.

In a preferred embodiment of the invention, the linkage means includes a pivot shaft extending transversely of the vehicle and connected to the output member, a first pedal arm connecting the first pedal member to the pivot shaft, and a second pedal arm connecting the second pedal member to the pivot shaft. A point of connection between the first pedal member and the pivot shaft and a point of connection between the second pedal member and the pivot shaft may be opposed to each other across an axis of the pivot shaft.

Thus, with a seesaw type change speed pedal pivotable about an axis extending transversely of the vehicle, the operator may just move the heel slightly and turn the toe-end of his or her foot sideways to be able to depress both the first pedal member for forward drive and the second pedal member for backward drive. Delicate controls are thus possible for both forward drive and backward drive of the vehicle. The change speed pedal according to the present invention may be mounted in position with ease since it is not very long in the fore and aft direction of the vehicle.

With a human engineering approach to improved operability, it is recommendable for the second pedal member to be disposed at an angle for allowing the operator as seated to apply the down-toe motion to the second pedal member in a natural way while turning rightward to look back.

The foregoing and other objects, features and advantages of the invention will be apparent from the following more particular description of preferred embodiments of the invention, as illustrated in the accompanying drawings.

BRIEF DESCRIPTION OF THE DRAWINGS

FIG. 4 is a side view of the change speed pedal.

DESCRIPTION OF THE PREFERRED EMBODIMENTS

The present invention will be described hereinafter as applied to a riding type lawn mower, with reference to the drawings.

Figure 1:
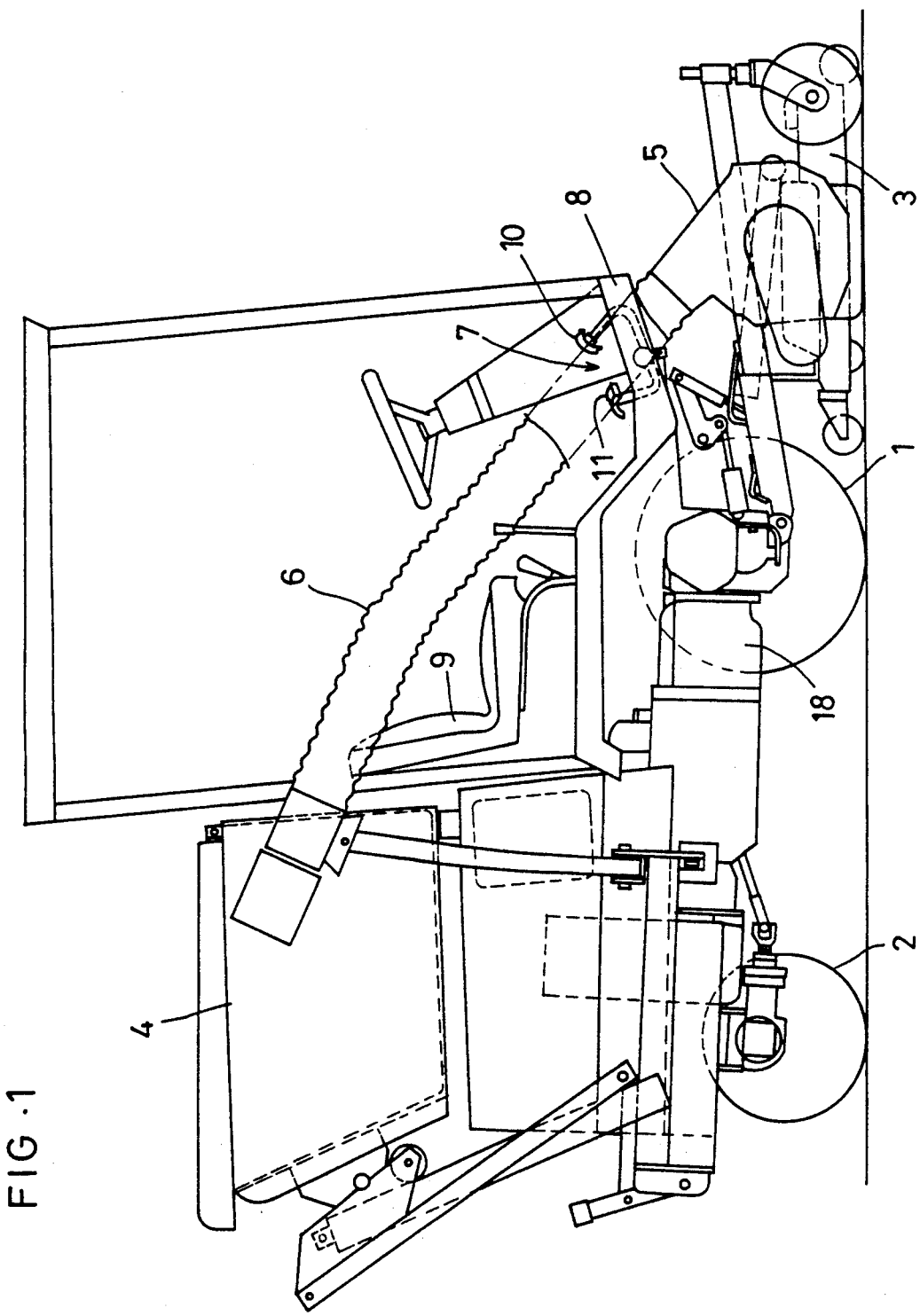
FIG. 1 is a side elevation of a lawn mower employing a change speed pedal mechanism according to the present invention.

As shown in FIG. 1, the riding type lawn mower comprises front wheels 1 acting as drive wheels, and rear wheels 2 acting as steering wheels. A vehicle body supported on the front and rear wheels 1 and 2 carries a grass cutting implement 3 at a forward end, and a grass catcher 4 on a rear position thereof. Grass cut by the cutting implement 3 is delivered by a blower 5 through a duct 6 to the grass catcher 4.

This riding type lawn mower includes a hydrostatic stepless transmission 18 for changing the speed of propelling drive. The transmission 18 is operable by a change speed pedal 7. As shown in FIGS. 1 through 4, the change speed pedal 7 is pivotably supported on an axis P1 extending under a floor panel 8 transversely of the vehicle body, and is disposed at a position forwardly of and at a right-hand side of a driver's seat 9.

Specifically, the change speed pedal 7 includes a supporting boss 12 rotatable on the transverse axis P1, and a first arm 13 connected to the boss 12 at point Pa and extending forwardly from the boss 12 and carrying a forward drive depress pad 10 fixed to a forward end thereof. A second arm 14 is connected to the boss 12 at a point Pb opposed to the point Pa across the axis P1 and extends rearwardly and outwardly from the boss 12, with a backward drive depress pad 11 fixed to the second arm 14.

Figure 5:
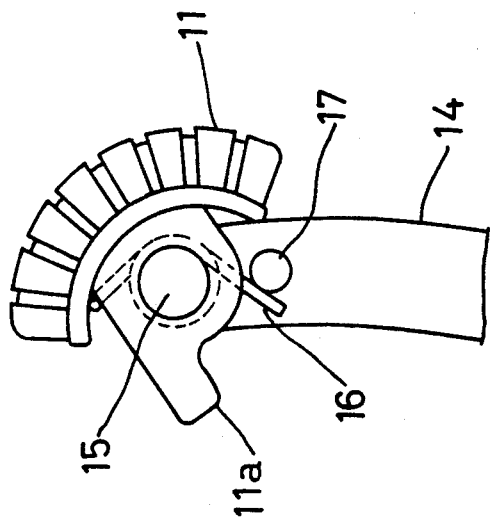
FIG. 5 is a side view of a portion of the change speed pedal including a backward drive depress pad.

Next, an attachment structure for the backward drive depress pad 11 will particularly be described with reference to FIGS. 4 and 5. A first pin 15 is fixed to an upper end of the second arm 14 to extend obliquely in plan view. The backward drive depress pad 11 is pivotably mounted on the first pin 15, and is urged by a helical spring 16 to a position inclined rearwardly of the vehicle body (clockwise in FIG. 5).

As shown in FIG. 4, the forward drive depress pad 10 and backward drive depress pad 11 are located above the floor panel 8, and the first arm 13 and second arm 14 extend through bores 8a and 8b defined in the floor panel 8, respectively, with large parts of the first and second arms 13 and 14 disposed below the floor panel 8. Thus, there is no obstructive linkage members above the floor panel 8, and the area between the forward drive depress pad 10 and backward drive depress pad 11 may conveniently be used as a foot rest area for the driver.

The portions of the first and second arms 13 and 14 may be curved with a radius $R_1$ and $R_2$, substantially corresponding to the distance to the transverse axis P1. This construction is effective to minimize the diameter of the bores 8a and 8b defined in the floor panel 8.

Figure 2:
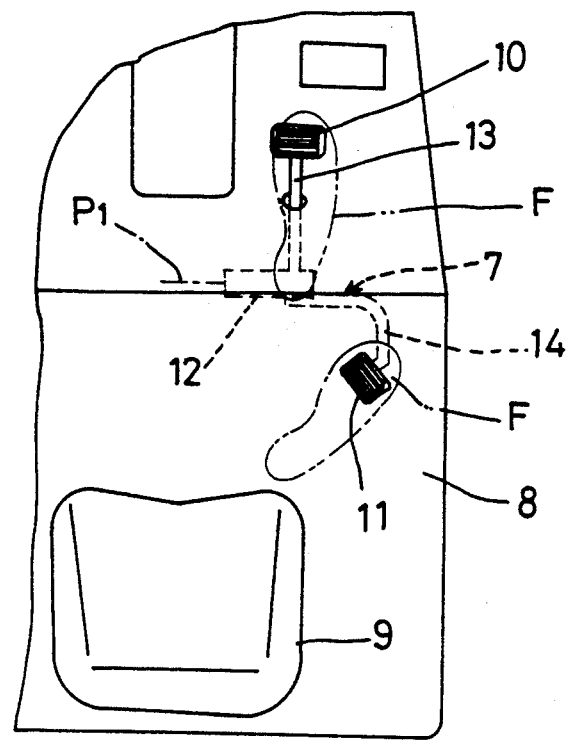
FIG. 2 is a plan view of a change speed pedal and adjacent components.
Figure 3:
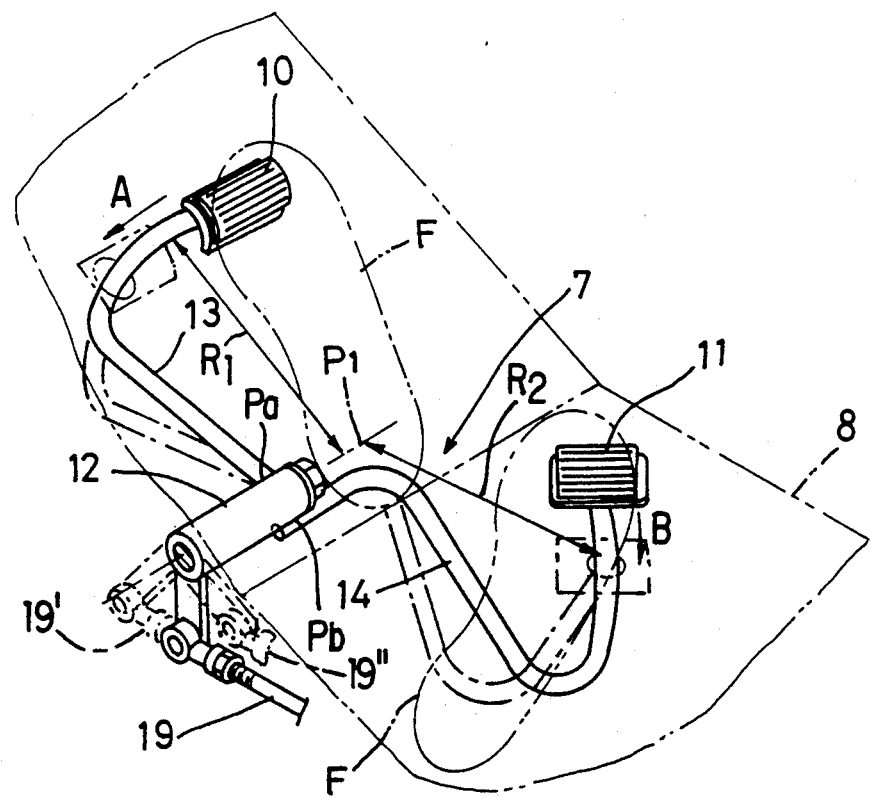
FIG. 3 is a perspective view of the change speed pedal.

According to the described construction, as shown in FIGS. 2 and 3, the driver places the heel of his or her right foot F on the floor panel 8 and applies a toe-down motion in the direction of arrow A to the forward drive depress pad 10. Then hydrostatic stepless transmission 18 is controlled through an output member in the form of an interlocking rod 19 to accelerate the mower forward. The driver may turn the toe-end of his or her right foot F outward while moving the heel rearwardly, to be able to apply a toe-down motion in the direction of arrow B to the backward drive depress pad 11, with the heel resting on the floor panel 8. Then the transmission 18 is controlled to accelerate the mower backward. When neither pad 10 nor pad 11 is depressed, the output member 19 is in its neutral position; when pad 112 is depressed down to the floor panel 8, the output member is in one extreme position designated 19' and when pad 10 is depressed down to the floor panel 8, the output member is in another extreme position 19".

The backward drive depress pad 11 is disposed at an angle as noted above, in order to allow the seated driver to depress the backward drive depress pad 11 in a natural way while turning rightward to look back.

When depressed with the right foot F, the backward drive depress pad 11 rotates forwardly of the vehicle body (counterclockwise in FIG. 5) to facilitate the depression with the right foot F. The backward drive depress pad 11 includes a stopper 11a which abuts upon a second pin 17 fixed to the second arm 14, for stopping the rotation of the backward drive depress pad 11.

Figure 6:
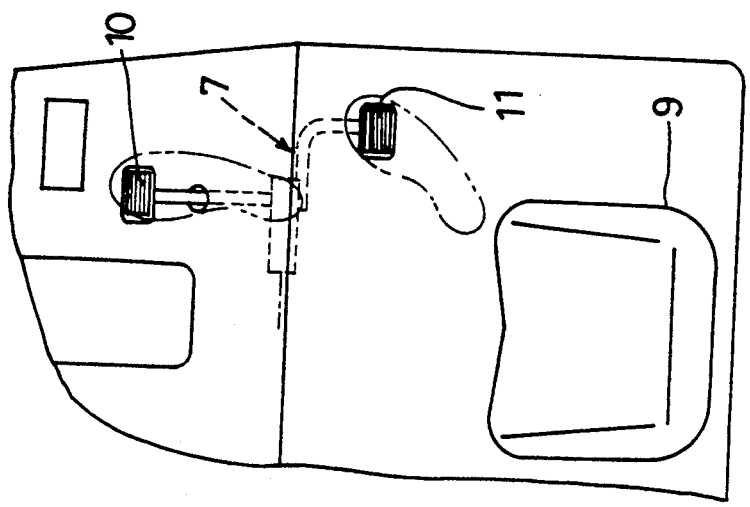
FIG. 6 is a plan view of a modified change speed pedal.

FIG. 6 shows a modified and simplified change speed pedal mechanism. In this example, the change speed pedal 7 includes a forward drive depress pad 10 and a backward drive depress pad 11 simply displaced from each other transversely of the vehicle body, instead of the backward drive depress pad 11 being disposed at an angle.

What is claimed is:

1. A bidirectional control arrangement for a vehicle comprising:

a first pedal member and a second pedal member interlocked to each other to make a seesaw-like movement, an output member linearly reciprocable between a neutral position and two opposite extreme positions, and linkage means for transmitting down-toe motion of an operator's foot applied to said first pedal member to said output member as movement in one direction of said output member, and transmitting down-toe motion of the operator's foot applied to said second pedal member to said output member as movement in another direction of said output member, wherein said linkage means includes a pivot shaft extending transversely of the vehicle and connected to said output member, a first pedal arm connecting said first pedal member to said pivot shaft, and a second pedal arm connecting said second pedal member to said pivot shaft, a first point of connection between said first pedal member and said pivot shaft and a second point of connection between said second pedal member and said pivot shaft being opposed to each other across an axis of said pivot shaft, and wherein said first pedal member and said second pedal member are spaced apart longitudinally of said vehicle and offset from each other transversely of the vehicle, said first pedal member and said second pedal member are disposed above a floor panel, said first pedal arm and said second pedal arm extending through said floor panel with large parts thereof disposed below said floor panel, and portions of said first and second pedal arms are curved with a radius of curvature corresponding to a distance to said pivot shaft, for minimizing a diameter of through bores defined in said floor panel.

2. A bidirectional control arrangement for a vehicle comprising:

a first pedal member and a second pedal member interlocked to each other to make a seesaw-like movement, an output member linearly reciprocable between a neutral position and to opposite extreme positions, and linkage means for transmitting down-toe motion of an operator's foot applied to said first pedal member to said output member as movement in one direction of said output member, and transmitting down-toe motion of the operator's foot applied to said second pedal member to said output member as movement in another direction of said output member, wherein said first pedal member and said second pedal member are spaced apart longitudinally of the vehicle and said second pedal member is offset from said first pedal member transversely of the vehicle in the rightward direction, and said pedal member is rotatably mounted on a pedal arm and includes a stopper for determining a limit to rotation of said second pedal member.

* * * * *